T. P. TOWNES.
ANTI-BACK-FIRING DEVICE FOR AUTOMOBILE CRANKS.
APPLICATION FILED JULY 18, 1917.
1,304,632.
Patented May 27, 1919.
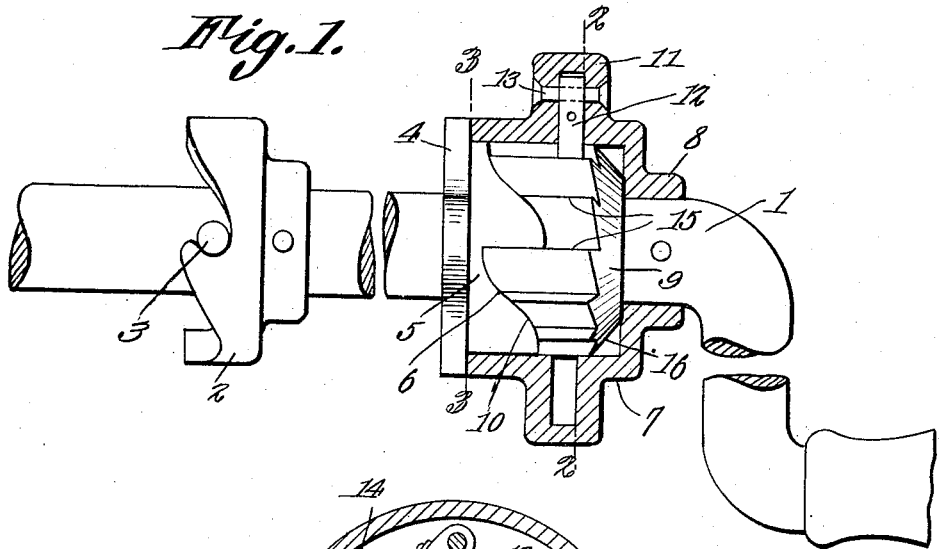
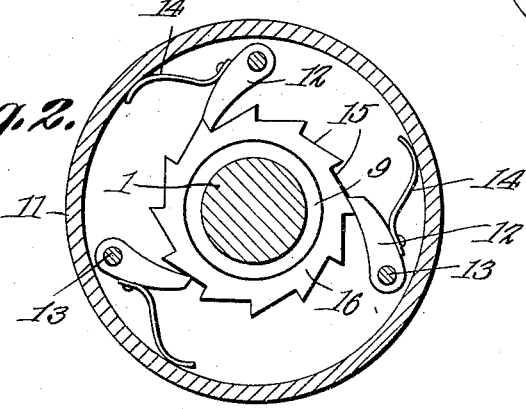
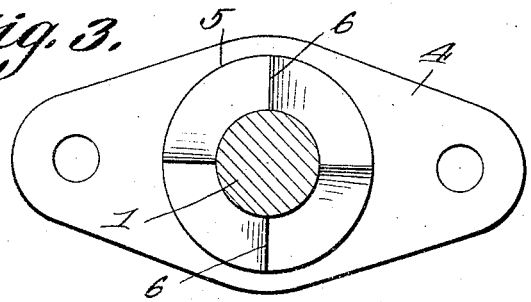
Witnesses
T. P. Townes
Inventor,
by C. A. Snow & Co.
Attorneys.

UNITED STATES PATENT OFFICE.

THOMAS P. TOWNES, OF SPRINGFIELD, ILLINOIS.

ANTI-BACK-FIRING DEVICE FOR AUTOMOBILE-CRANKS.

1,304,632.   Specification of Letters Patent.   Patented May 27, 1919.

Application filed July 18, 1917. Serial No. 181,323.

*To all whom it may concern:*

Be it known that I, THOMAS P. TOWNES, a citizen of the United States, residing at Springfield, in the county of Sangamon and State of Illinois, have invented a new and useful Anti-Back-Firing Device for Automobile-Cranks, of which the following is a specification.

The present invention appertains generally to cranking devices for automobile engines, and it is the object of the invention to provide a novel and improved yet extremely simple and compact device for automatically disconnecting the crank from the engine crank shaft in case of back firing, so as to avoid the reverse rotation of the crank and possible injury to the operator.

The invention aims to provide a device of the nature indicated embodying a novel assemblage of the component elements, but few parts being employed, and the device being devoid of complicated mechanism and being sightly in appearance, one of the operating parts housing the others.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:

Figure 1 is a side elevation of a crank showing the device applied, portions being broken away and shown in section.

Figs. 2 and 3 are cross sections on the respective lines 2—2 and 3—3 of Fig. 1.

The numeral 1 designates the starting crank of an automobile engine, which is provided with a clutch member 2 to engage the clutch member 3 of the engine crank shaft, the crank 1 being moved rectilinearly to bring the clutch members into engagement. As ordinarily used, should the engine back fire, the crank is rotated reversely in a violent manner, not infrequently causing injury to the operator, which it is the object of the present invention to overcome.

In carrying out the present invention, there is provided a plate or stationary member 4 adapted to be bolted or otherwise fastened to the frame of the automobile so as to remain fixed, and this plate is provided with an outstanding boss 5 through which the crank 1 extends, said plate and boss having an opening for the passage of the crank. The boss 5 is provided with ratchet teeth 6 in its face, the cam surfaces of which extend helically in the proper direction.

A cup-shaped member 7 is provided with a hub 8 secured in any suitable manner upon the crank 1, and the rim of the member 7 fits upon the boss 5 for rotary movement. A ring 9 is mounted loosely upon the crank 1 between the plate 4 and hub 8 of the member 7, and is inclosed by said member. The rear face of the ring 9 is provided with ratchet teeth or cams 10 matching the ratchet teeth or cams 6.

In order to rotate the ring 9 with the member 7 and crank 1 when the crank is rotated reversely, the member 7 is provided at an intermediate portion with an outstanding annular channel-portion 11 in which pawls or dogs 12 are disposed, pivots 13 for said pawls extending transversely through the portion 11 at the exterior of the body of the member 7. Leaf springs 14 are secured to the pawls and bear against the intermediate wall of the portion 11 to press the pawls inwardly against the ring 9, the periphery of which is provided with an annular series of ratchet teeth 15 facing in the proper direction. The teeth 15 extend from one face of the ring to the other in order that the ring 9 and member 7 can be slid together longitudinally, that face of the ring 9 opposite to the face having the ratchet teeth 10 being beveled, as at 16, whereby when the ring 9 and member 7 are moved together, the beveled surface 16 will separate the pawls 12 so that the ring can be readily moved into place. The member 7 thus incloses the working parts for protection and to render the device neat in appearance.

In operation, when the crank 1 is moved rectilinearly to bring the clutch member 2 into engagement with the clutch member 3, the ring 9 is moved to bring its teeth or cams 10 into engagement and abutment with the teeth or cams 6 of the stationary plate 4. Then, when the crank 1 is rotated (clockwise as seen in Fig. 2), the member 7 in being rotated with the crank will serve to drag the pawls 12 past the teeth 15 of the ring 9, said ring 9 being prevented from rotation by engagement with the stationary plate or member 4. Should the engine back fire, thus forcibly turning the crank reversely, the pawls 12 in engaging the teeth 15 will rotate the ring 9 with the crank, and the teeth or cams 10 of the ring in moving along the teeth or cams 6, will force the crank outwardly or forwardly by a quick movement, thus removing the clutch member 2 from the clutch member 3, and disconnecting the crank automatically from the engine crank shaft. This will avoid the reverse spinning of the crank, since the crank is disconnected from the engine as soon as the crank is rotated reversely a slight amount.

Having thus described the invention, what is claimed as new is:

1. A cranking device embodying a crank, a stationary member having a boss provided with a ratchet cam, a ring rotatable loosely on the crank and having a ratchet cam engageable with the aforesaid cam to shift the crank longitudinally when rotated reversely, ratchet teeth on the outer periphery of the ring, a cup-shaped member secured on the crank and inclosing the ring, the rim of said cup-shaped member fitting said boss, and a pawl carried by the cup-shaped member and engaging said ratchet teeth to rotate the ring reversely with the crank.

2. A cranking device embodying a crank, a stationary member having a boss provided with ratchet cams in its face, a ring rotatable loosely on the crank and having ratchet cams at one face engageable with the aforesaid cams to shift the ring away from said member when rotated reversely with the crank, the ring having ratchet teeth in its periphery, a cup-shaped member secured to the crank, inclosing said ring and having its rim fitting upon said boss, said cup-shaped member having an outstanding annular channel-portion, and spring pressed pawls pivoted within said portion and engageable with said teeth.

In testimony that I claim the foregoing as my own, I have hereto affixed my signature in the presence of two witnesses.

THOMAS P. TOWNES.

Witnesses:
 IVY E. SIMPSON,
 MONROE E. MILLER.

Copies of this patent may be obtained for five cents each, by addressing the "Commissioner of Patents, Washington, D. C."